US010769126B1

(12) United States Patent
Hagerup

(10) Patent No.: US 10,769,126 B1
(45) Date of Patent: Sep. 8, 2020

(54) DATA ENTROPY REDUCTION ACROSS STREAM SHARD

(71) Applicant: Amazon Technologies, Inc., Seattle, WA (US)

(72) Inventor: Erik Hagerup, Bothell, WA (US)

(73) Assignee: Amazon Technologies, Inc., Seattle, WA (US)

(*) Notice: Subject to any disclaimer, the term of this patent is extended or adjusted under 35 U.S.C. 154(b) by 329 days.

(21) Appl. No.: 15/713,366

(22) Filed: Sep. 22, 2017

(51) Int. Cl.
  *G06F 17/00* (2019.01)
  *G06F 16/22* (2019.01)
  *G06F 16/2453* (2019.01)

(52) U.S. Cl.
  CPC ...... *G06F 16/2228* (2019.01); *G06F 16/2453* (2019.01)

(58) Field of Classification Search
  None
  See application file for complete search history.

(56) References Cited

U.S. PATENT DOCUMENTS

| 8,935,221 | B1* | 1/2015 | Lazier | G06F 11/14 707/690 |
| 9,613,127 | B1* | 4/2017 | Rus | G06F 16/285 |
| 9,667,720 | B1* | 5/2017 | Bent | H04L 67/1097 |
| 2005/0071349 | A1 | 3/2005 | Jordan et al. | |
| 2013/0198159 | A1* | 8/2013 | Hendry | G06F 16/242 707/706 |
| 2014/0317448 | A1* | 10/2014 | Rash | G06F 11/1446 714/15 |
| 2015/0032764 | A1* | 1/2015 | Lee | G06F 16/81 707/755 |
| 2015/0134797 | A1 | 5/2015 | Theimer et al. | |
| 2015/0277965 | A1* | 10/2015 | Bradshaw | G06F 9/466 718/101 |
| 2015/0310044 | A1* | 10/2015 | Isaacson | G06F 16/256 707/613 |
| 2016/0085839 | A1* | 3/2016 | D'Halluin | G06F 16/278 707/747 |
| 2016/0105370 | A1* | 4/2016 | Mellor | H04L 45/02 709/226 |
| 2017/0032011 | A1* | 2/2017 | Song | G06F 16/25 |
| 2017/0083579 | A1* | 3/2017 | Du | G06F 16/182 |
| 2017/0255634 | A1* | 9/2017 | Wang | G06F 16/3331 |
| 2017/0286485 | A1* | 10/2017 | Chandramouli | G06F 16/245 |

(Continued)

*Primary Examiner* — Hasanul Mobin
(74) *Attorney, Agent, or Firm* — Robert C. Kowert; Kowert, Hood, Munyon, Rankin & Goetzel, P.C.

(57) ABSTRACT

Systems and methods are disclosed to implement a re-sharding technique that redistributes data in a first set of shards of a first stream into a second set of shards of a second stream to reduce the entropy of the data. In embodiments, individual ones of a number of re-sharding nodes determine statistics on an individual shard. The statistics include, for individual data keys in the shard, a frequency of the key and the cardinality of the key. The re-sharding node then selects a list of high-frequency, low-cardinality keys to be used generate a re-sharding scheme that is used to redistribute data items in the first set of shards to the second set. The re-sharding scheme assigns data items having the same key value combinations to the same range of shards in the second set. Accordingly, upon redistribution, data entropy in the second set of shards is reduced.

20 Claims, 10 Drawing Sheets

(56) References Cited

U.S. PATENT DOCUMENTS

| | | | |
|---|---|---|---|
| 2017/0322996 A1* | 11/2017 | Horowitz | G06F 16/278 |
| 2018/0004426 A1* | 1/2018 | Barton | G06F 3/0631 |
| 2018/0314750 A1* | 11/2018 | Merriman | G06F 16/278 |
| 2019/0004906 A1* | 1/2019 | Shoolman | G06F 11/1461 |

* cited by examiner

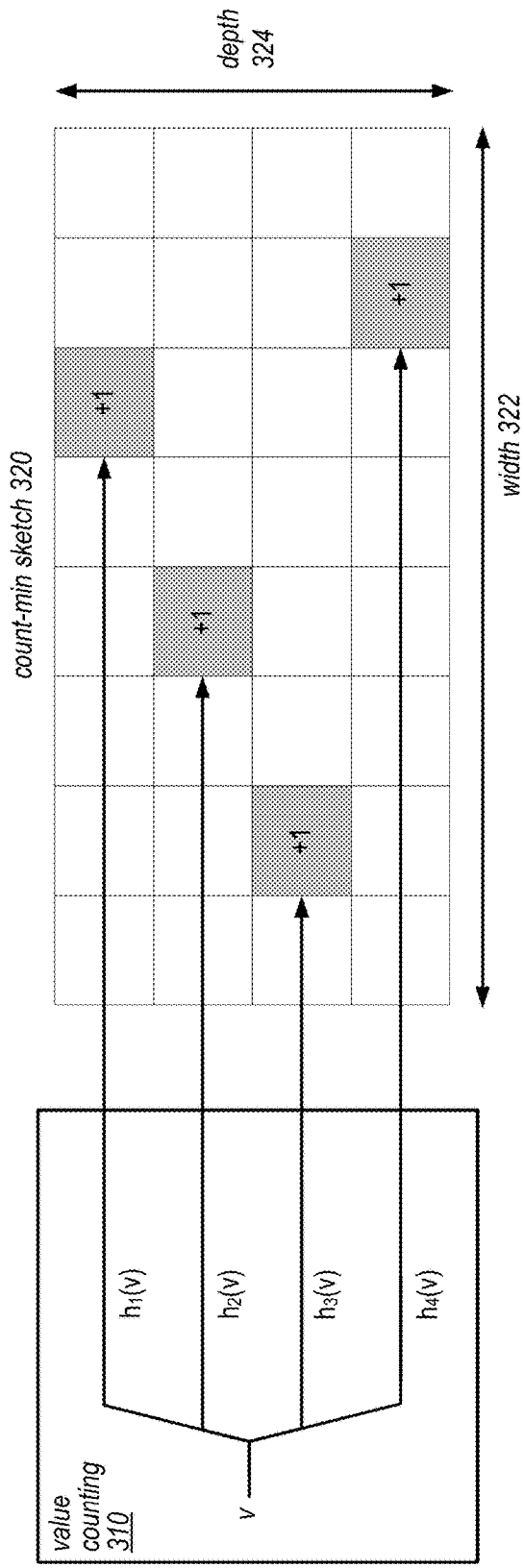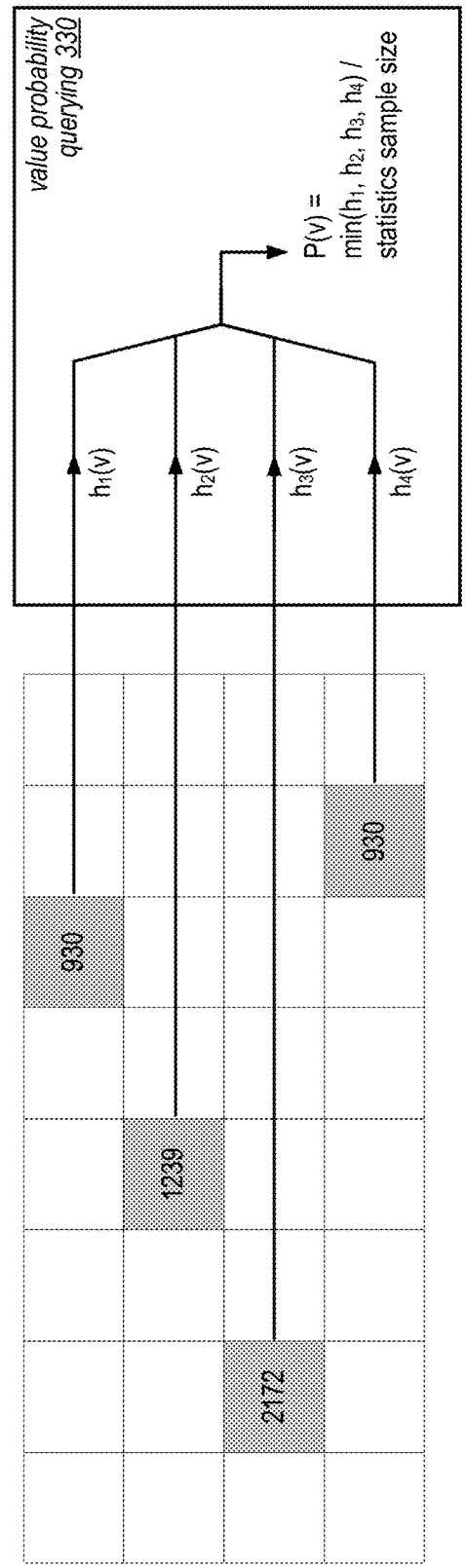
FIG. 3A
FIG. 3B

| key 410 | key cardinality (CARD) 420 | key frequency (FREQ) 430 | re-shard key suitability indicator (RKSI) 440 |
|---|---|---|---|
| operation | 2 (get, put) | 99% | 99 |
| statusCode | 3 (100, 200, 400) | 90% | 80 |
| error | 4 (0, 1, 2, 9) | 36% | 70 |
| userFlags | 11 | 10% | 33 |
| userID | 5055 | 100% | 10 |
| ... | | | | re-shard keys 450 (columns 420, 430, 440)

RKSI ~ FREQ / log(CARD)

DATA ENTROPY REDUCTION ACROSS STREAM SHARD

BACKGROUND

As the costs of data storage have declined over the years, and the capabilities of computer networks have improved, more and more data pertaining to a wide variety of applications can potentially be collected and analyzed. In particular, the increase in volumes of streaming data has been accompanied by (and in some cases made possible by) the increasing use of commodity hardware. The advent of virtualization technologies for commodity hardware has provided benefits with respect to managing large-scale computing resources for many types of applications, allowing various computing resources to be efficiently and securely shared by multiple customers. However, despite the continued maturation of such technologies, the management and orchestration of the collection, storage and processing of large dynamically fluctuating streams of data remain a challenging proposition for a variety of reasons.

In one scenario, a data stream service may receive data that is semi-structured and unaccompanied by any schema data. For example, the data may include records with varying keys and varying values. When such data is randomly partitioned and/or stored into storage units without regard to its structure, the result is a data store that exhibits a high degree of data "entropy." That is, the data store will contain large groups of data records of different structure and different values, stored in close proximity with each other. As may be understood, such a disorganized store of data will be difficult to use and manage, and is undesirable for a host of reasons. It is generally desirable to reduce the entropy of such data to allow downstream systems to make more efficient use of the data.

BRIEF DESCRIPTION OF THE DRAWINGS

FIGS. 3A and 3B illustrate an example count-min sketch structure that is used by a stream re-sharding system to reduce data entropy across stream shards, according to some embodiments.

FIG. 4 illustrates statistics data that is used to select a set of re-shard keys used in a stream re-sharding system to reduce data entropy across stream shards, according to some embodiments.

Figure 1:
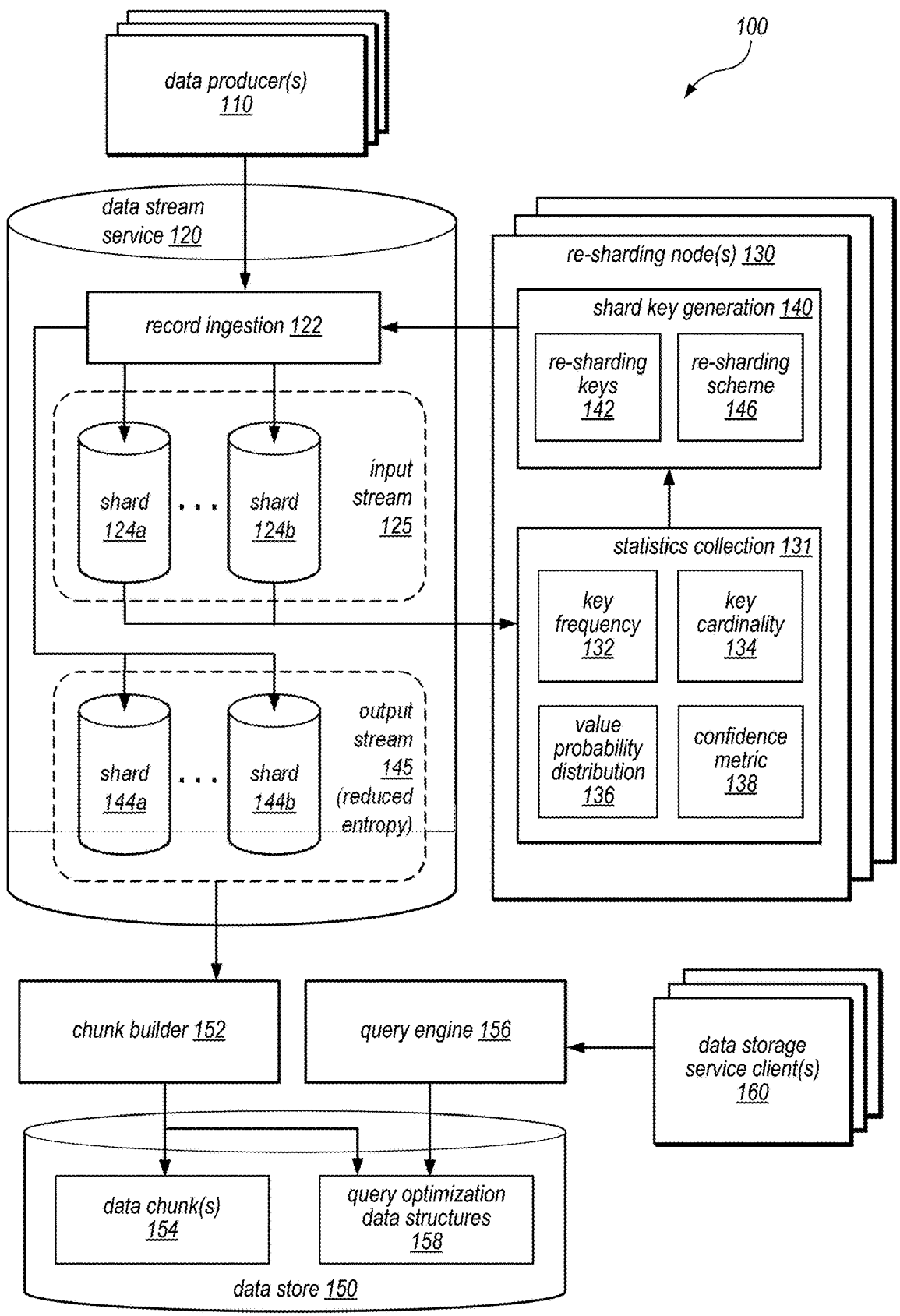
FIG. 1 is a block diagram illustrating an example stream re-sharding system that reduces data entropy across stream shards, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to implement a stream re-sharding system that redistributes stream data from a first set of stream shards to a second set, in order to reduce data entropy across stream shards. In embodiments, a re-sharding node of the re-sharding system collects statistics on an individual stream shard in the first set. The statistics include, for example, for individual data keys seen in the stream shard, a frequency of the key and the value cardinality of the key, which indicates a number of distinct values for that key seen in the stream shard. The re-sharding system may then select, based on the statistics, a list of high-frequency, low-cardinality keys to be used as the re-sharding keys to redistribute data items from the first set of stream shards to the second set. In embodiments, a re-sharding scheme may be generated to assign data items having the same key values to the same range of stream shards in the second set. In this manner, data entropy of the second set of stream shards is reduced.

The term "entropy" in this context refers to a measure that indicates how closely records or data items of similar structure and data value are grouped together. Thus, a data store or a data stream that have groups of data with completely random distributions of record structures (e.g., different keys) and data values are said to have high data entropy. On the other hand, a data store or data stream that have data groups that are relatively organized in terms of data structure and data values and said to have low data entropy. In some contexts, entropy may be indicated by a number of different key-value combinations that are contained in a unit of data. For this example, a data unit that has three keys with three values each (i.e. a total of nine key-value combinations) may be said to have a lower entropy than a data units that has two keys with two values each (a total of four key-value combinations). The number of distinct values that exist for a given key or attribute may be referred to as the "cardinality" of the given key or attribute.

It is generally desirable to reduce the entropy of data in data stores and data streams. In many contexts, data that are stored in an organized fashion may allow the consumers of such data to make more efficient use of the data. For example, when low-entropy data is stored in a data store, processes may be employed to generate a search index (sometimes a probabilistic index) on top of the data. Such processes may recognize the spatial locality of the data in data store, and generate an index that is optimized to the way the data is organized. As another example, consumers of data from a low-entropy data stream may take advantage of the temporal locality of data in the stream, to more efficiently process successive records in the stream, for example, by caching processing elements used for the same record structures or values from one record to the next. As may be understood by those skilled in the art, different optimizations may be used in a variety of applications to take advantage of well-organized, low-entropy data sets.

In some situations, a data stream service may receive incoming data that has a high entropy. Such data may be semi-structured (e.g., each data item may include a different set of keys from a universe of keys). However, in some cases, the incoming data may not be accompanied by any schema data. For example, a data stream service may be configured to receive a log of service requests and associated responses, which is ordered by the request time. However, such an ordering of the data may not be useful to downstream systems, which are more likely to use the log data based on other attributes. The incoming data exhibits a relatively high degree of entropy with respect to these other attributes.

Accordingly, embodiments of a stream re-sharding system are described herein to first determine a selection of keys that are likely to be useful to downstream applications of the stream data, and then reorganize the stream in an efficient manner, in order to reduce the entropy of the data with respect to this selection of keys. In some embodiments, the stream re-sharing system may initially distribute the incoming data to a set of stream shards in a pseudo-random fashion. Each stream shard may be directed a different re-sharding node. One or more of the re-sharding nodes may perform some statistical analysis on their respective stream shards, and determine a selection of data keys as re-sharding keys, which are used to reorganize or redistribute the data. In some embodiments, the incoming data may be distributed in a sufficiently random manner, so that statistical analysis on each of the resulting stream shards are likely to yield the same results. In some embodiments, the re-sharding keys may be selected based on particular statistical characteristics of the keys seen in the data, such as the frequency of the key, and the cardinality of the key. After a set of re-sharding keys are selected, the re-sharding system may then determine a re-sharding scheme to redistribute data items in the first set of stream shards to a second set of new stream shards. The re-sharding scheme may assign data items to a range of stream shards in the second set, such that data items having the same keys and values are grouped together in the same range. As may be understood, the redistribution will likely reduce the average entropy of stream shards from the first set of stream shards to the second set of stream shards. For example, each stream shard in the second set is likely to have, on average, less variety in terms of keys and values.

The redistribution process achieves a number of benefits. First, the process takes a stream of data without an explicit schema, and infers a useful schema and organization strategy based on observed statistics from the data. Second, because the stream is initially partitioned in a random fashion, the process is able to make its decisions by examining only a subsample of the stream data (e.g., a stream shard). In some embodiments, a confidence metric is determined to track whether the observed statistics exceed a confidence threshold, so that decisions are not made based on statistics that reflect high variance. Third, the process may be carried out in a single pass of the stream data, so that it may be accomplished using relatively simple logic during the data ingestion stage. While some buffering of data may be needed, in some embodiments, to allow the re-sharding system to observe the incoming stream to determine how the redistribution should be performed, once those determinations are made, the processing of the incoming data may occur largely in tandem with the redistribution of the stream.

In some embodiments, the contents of each redistributed stream shard may be stored into a separate storage unit or chunk of a data store, so that the data store can take advantage of the reorganization performed by the re-sharding system. For example, in some embodiments, a downstream system may generate a search index over the chunks that allows a search to skip one or more chunks, based on the search criteria. Other optimizations by downstream data consumers are also possible, as will be appreciated by those skilled in the art. These and other features and benefits of the entropy-reducing re-sharding system are described in further detail below, in connection with the disclosed embodiments and the figures.

FIG. 1 is a block diagram illustrating an example stream re-sharding system that reduces data entropy across stream shards, according to some embodiments. As shown, the figure depicts a data stream service 120 that receives an input data from one or more data producers 110 and produces output data to data consumers, such as chunk builder 152. Within the data stream service 120, the data may be maintained as an input stream 125, which is then redistributed to an output stream 145. The output streams 145 may, as shown, exhibit reduced data entropy.

In some embodiments, the data stream service 120 may be configured to manage the creation, storage, retrieval, and processing of large-scale data streams designed to handle hundreds or even thousands of concurrent data producers 110 and data consumers. The data producers 110 and data consumers may be individual computers, which may be physical computers or virtual machine instances.

The input data may include a sequence of data records that may be generated by one or more data producers 110 and accessed by one or more data consumers, where each data record is a sequence of bytes. The data producers 110 and data consumers may communicate with the data stream service 120 via a network. In various embodiments, network may encompass any suitable combination of networking hardware and protocols necessary to establish network-based communications among these entities. For example, a network may generally encompass the various telecommunications networks and service providers that collectively implement the Internet. A network may also include private networks such as local area networks (LANs) or wide area networks (WANs) as well as public or private wireless networks. For example, data producer 110 and data consumer may be respectively provisioned within enterprises having their own internal networks. In such embodiments, the network may include the hardware (e.g., modems, routers, switches, etc.) and software (e.g., protocol stacks, accounting software, firewall/security software, etc.) necessary to establish a networking link between the data producer 110 and the data stream service 120 as well as between the data stream service 120 and data consumer. In some embodiments, the entities may communicate using a private network rather than the public Internet.

In some embodiments, the stream process 120 may be a stream management service (SMS) that provides programmatic interfaces (e.g., application programming interfaces (APIs), web pages or web sites, graphical user interfaces, or command-line tools) to enable the creation, configuration and deletion of streams, as well as the submission, storage and retrieval of stream data records in some embodiments. In some embodiments, dynamically provisioned sets of compute, storage, and networking resources may be used to implement the data stream service 120, based for example on various partitioning policies that allow the stream management workload to be distributed in a scalable fashion among numerous service components. The compute nodes of the data stream service 120 may comprise a collection of virtual and/or physical resources used to implement various functions in the data stream service 120.

In some embodiments, the input data may be divided into a group of partitions or shards. In some embodiments, a stream shard may be a unique identified subset of data records in the stream. Each shard may provide a fixed unit of capacity for the data stream service 120. For example, each shard may support up to a certain number of transactions per second or data capacity, up to a maximum. Thus, the data or processing capacity of the entire input stream is a function of the number of shards that is specified for the input stream. In some embodiments, a partition key of the data records may be used to assign the data records to the shards. For example, the incoming data records may be assigned to shards in a random fashion, using a MD5 hash function to map the records to their respective shards, based on their partition key.

In some embodiments, the partitioning of the input data stream into stream shards 124a-b may be performed using a record ingestion node or module 122, which may implement a randomized sharding scheme. In some cases, the data producers 110 may provide explicit partitioning keys with each write operation which may serve as the partitioning attributes, and such keys may be mapped to partition identifiers. In other embodiments, the record ingester 122 may simply distribute the data items in the input data in a pseudorandom fashion into the multiple stream shards 124. As discussed, the incoming data and the resulting stream shards 124 produced by the record ingester 122 may include data items that have a random distribution of different keys and values. In some cases, the input data may not be accompanied by a schema. The input data and initial stream shards 124 are not generally organized to group data items having similar structure and data values in close proximity. Thus, the input data and initial stream shards 124 may exhibit a high data entropy.

In some embodiments, each initial shard 124 may be processed by a respective re-sharding node 130, which reside outside of the data stream service 120. In other embodiments, the re-sharding nodes 130 may be implemented as part of the data stream service 120. The re-sharding nodes 130 may implement a statistics collection module 131. Because the stream shards 124 may be produced from the input data in a largely random manner, each of the stream shards 124 may reflect a similar set of statistics, given enough data. Accordingly, in some embodiments, the redistribution decisions may be made locally at each of the individual re-sharding nodes 130. Given the randomness of the initial distribution and the amount of statistics that are gathered, it may be determined that statistics collected for a single stream shard is approximately the same for all shards 124. Thus, in some embodiments, only one shard may be used to determine statistics and the re-sharding scheme. In some embodiments, only a subset of shards 124 may be used. In some embodiments, every re-sharding node 130 may make its own individual re-sharding scheme, and assume that the other re-sharding nodes 130 will determine the same re-sharding scheme based on their respective shard statistics. Thus, because of the randomness in the initial distribution performed by the record ingester 122, each individual re-sharding node may effectively share common state with respect to the collected statistics.

The statistics collection module 131 may examine each record or data item in a stream shard 124, and aggregate statistics based on observed characteristics of the data items. In some embodiments, the statistics collector 131 may gather data about each distinct key or attribute seen in the stream shard 124. The statistics collector 131 may use a number of data structures to efficiently capture metadata about each key seen the stream shard, and then use the metadata to rank and/or select keys to be used as re-sharding keys 142. The re-sharding keys 142 may include keys that are determined to be suitable keys used to reorganize the data items when they are redistributed to the shards 144 in the output stream 145. In some embodiments, only a subset of keys in the shard may be selected as re-sharding keys 142, based on the key's metadata or statistics. In some embodiments, all of the keys in the stream shard 124 may be ranked according to a re-sharding key suitability indicator (RKSI), so that higher ranking re-sharding keys are used to perform higher level reorganizations during the redistribution process, while lower ranking re-sharding keys are used to perform lower level reorganization. In some embodiments, the re-sharding keys 142 may be stored as an ordered list of keys.

The re-sharding keys 142 may be selected based on a number of statistics collected for each of the seen keys. For example, one statistic used to select the re-sharding keys 142 may be the key frequency seen in the stream shard 124. Thus, for example, a key that appears in 99% of the data items in the stream shard will be preferred over a key that appears in only 30% of the data items. In some embodiments, the cardinality 134 of a key may also be used as a statistic to select the re-sharding keys 142. For example, some embodiments may prefer keys having a low cardinality (e.g., having only a small number of distinct values) as a re-sharding key. The idea here is that keys having a large number of distinct values (e.g., a globally unique ID) may not be useful for later searching and analysis, and thus, it would not be too useful to organize the data to optimize for searches or queries based on those high-cardinality keys. On the other hand, in some cases, keys having very low cardinalities (e.g., 1 or 2 values) may also be not very useful as re-sharding keys. Accordingly, in some embodiments, the re-sharding key selection decision may prefer keys within a certain range of cardinalities (e.g., 4-10) as the preferred cardinalities for the re-sharding keys 142.

In some embodiments, the re-sharding keys may be selected based on a re-sharding key suitability indicator (RKSI) value, which may be computed from the key frequency 132 and the key cardinality 134, among other statistics. For example, in some embodiments, the data stream service 120 may implement a RKSI determination function so that it produces RKSIs that increases with increasing values of the key frequency 132, and decreases with increasing values of the key cardinality 134. In some embodiments, the RKSI function may assign higher values to keys having a certain range of cardinality values. As a result, the re-sharding keys may simply be ranked according to their respective RKSIs to produce the ordered list of re-sharding keys 142. As may be appreciated by those skilled in the art, the precise manner of computing the RKSI or ranking the keys may vary depending on the embodiment, and all of these variations may be used in conjunction with the re-sharding system, as discussed herein.

In some embodiments, the manner of calculating the RKSI may be configurable by a user or administrator, via a configuration interface of the re-shard nodes 130 or the data stream service 120. For example, the re-sharding nodes 130 may implement a user or programmatic interface (such as an API) that allows a user or other module to configure the manner in which re-shard keys are selected and/or ranked. In some embodiments, the configuration may include a set of weights for one or more types of statistics that are determined from the shards 124. The ranking of keys for the re-shard key selection or ranking process may then be based on a weighted combination of the one or more statistics, using their respective weights. For example, for one type of stream, a user may specify that the key cardinality should be weighed as 80% of the key's rank value and the key frequency should be weight as 20% of the key's rank value. That rank value may then be computed for all observed keys in the shards 124, and used to select and rank the keys as re-shard keys. In some embodiments, the re-sharding nodes 130 may provide an interface, such as a graphical user interface, to allow a user or administrator to make updates to the re-sharding keys that are automatically determined based on the statistics. For example, before the redistribution process starts, the re-sharding nodes may allow an administrator an opportunity to adjust the re-sharding keys. The administrator may be permitted to add a key to the re-sharding key set, remove a key from the re-sharding key set, or change the ordering of keys within the resharding key set.

In some embodiments, the statistics collector 131 may maintain a confidence metric 138, which may reflect a confidence of the collected statistics or the determined list of re-sharding keys 142. The confidence metric 138 may be used to determine whether a determination by the re-sharding node is sufficiently reliable in terms of statistical stability or error. In some embodiments, the confidence metric 138 may be compared to a configurable threshold, and based on the comparison, the set of re-sharding keys 142 determined by a re-sharding node may be adopted or ignored.

In some embodiments, the confidence metric 138 may be implemented as a rolling variance that is maintained during the course of the statistics collection. For example, the statistics collection process may be recorded in time steps, so that at teach time step, a new data point for a statistic is generated. The time steps for the statistic may later be examined as a collective sample, to determine a mean and variance of the sample. From these values, statistics collector 130 may determine how much volatility is seen in that statistic. The volatility may, in some cases, indicate a probability of disagreement between the data or decisions of the different re-sharding nodes. In some embodiments, a confidence interval of the statistic may be determined from the rolling variance. Thus, if the variance of a statistic is too high or the confidence interval too large, the statistics collector 131 may refrain from using that statistic to determine the re-sharding keys, or defer selecting the re-sharding keys until a later time, when more data points are observed and the statistical variance is reduced.

In some embodiments, the confidence metric 138 may be based on the resulting RKSI values that are computed for each key seen in the stream shard. In some embodiments, the confidence metric is determined based on the difference of the RKSI values of close-ranking keys are. For example, the re-sharding node 130 may examine the difference between RKSI values of one key and the previous or next ranking key in the ordered list. If the RKSI values of two keys are too close (e.g., within a statistical tolerance or confidence interval), the confidence metric may be updated to reflect that the re-sharding key selection or ranking is not trustworthy. In that event, the re-sharding node 130 may refrain from selecting any re-sharding keys 142, or defer the selection decision until a later time, when more statistics are gathered and the re-sharding keys can be selected with more confidence.

In some embodiments, the statistics collector 131 may determine a value probability distribution 136, which may be used to determine, for a data item in the input stream, the expected likelihood of a particular value for a given key. Thus, for example, the probability distribution may indicate that if a key "statusCode" exists in a data item, the expected likelihood of a "statusCode" value of 40 is 30%. In some embodiments, this probability distribution may be stored as a group of raw counts that are maintained for each value of a key. These raw counts may be queried later, to determine the expected likelihood of that value. In some embodiments, the only an overall count for each value is maintained, so that the probability distribution indicates the overall probability of each value. In some embodiments, different counts of each value may be tracked under different circumstances. For example, the statistics collector 130 may track the count or probability of the key-value pair "income=$100,000" under two different values of another key "gender." The tracking of these conditional counts or probabilities may be useful to generate a better re-sharding scheme in a later step. For example, fewer new shards 144 may be assigned to "income=$100,000" under one gender as opposed to the other gender. In some embodiments, the data stream service 120 may first determine the ranking of the re-sharding keys 142 in a first step, and then determine the value probability distributions 136 in a second step, as conditional probabilities based on the ordering of the determined re-sharding keys 142. In some embodiments, the counts that are used to generate the probability distribution 136 may be maintained in a probabilistic data structure, such as a count-min sketch. In this manner, the memory used by the re-sharding node will be bounded by the fixed size of the probabilistic data structure, even when the input data stream contains many distinct values.

As shown, the re-sharding node 130 may include a shard key generator 140. In some embodiments, the re-sharding node 130 may generate an ordered list of re-sharding keys 142, and then from the ordered list, generate a re-sharding scheme 146. The re-sharding scheme 146 may indicate how data items are to be mapped to the new shards 144 of the output stream 145, based on their keys and values. In some embodiments, the shard key generator 140 generates a re-sharding scheme 146 as a set of rules, which assigns a given data item, based on its re-sharding keys (or absence thereof) and re-sharding key values (if any), to a particular output stream shard 144 (or a range of shards). Thus for example, a re-sharding scheme may specify that for a data item that has re-sharding key values "operation==put" and "statusCode==100", that data item should be mapped to a particular shard (e.g., shard 144*b*). Using this mapping, all data items in the initial shards 124 are redistributed to the shards 144.

The re-sharding scheme 146 may be built in a number of ways using the collected statistics, as may be appreciated by those skilled in the art. In some embodiments, the mapping building process may take each of the re-sharding keys in their rank order, and repeatedly subdivide the new shards 144 into increasingly smaller ranges. Ultimately, each eventual range of shards will correspond to a particular combination of re-sharding key values seen in the input data. In some embodiments, the process may continue to subdivide the shards 144 until all ranges are less than or equal to the capacity of a single shard 144 (e.g., 1,000,000 data items per shard). In some embodiments, the division may take into account the relative probabilities of each value for a given key (and within a given combination of key), so that a bigger range of shards is assigned to values having a higher probability. This process may thus continue for each re-sharding key, and for each value for that key, until all re-sharding keys are exhausted or all ranges are less than or equal to one shard. The result of this division process may be seen, in one example, in FIG. 5. As may be seen, the process strives to minimize the number of different re-sharding key values in the shards, thereby reducing the average entropy of the stream shards.

In some embodiments, the re-sharding scheme 146 may then be applied to the data items in the shard 124 received by the re-sharding node 130, and the re-sharding node 130 may generate a shard key for each data item. The shard key may be sent with the data item (e.g., as a partition key) back to the data stream service 120, via the record ingestion interface. The record ingestor 122 may redistribution the data items, based on the shard key values, to the new set of shards 144. In this manner, a reorganization of the data items is accomplished.

In some embodiments, the new shards 144 may be stream shards similar to the stream shards 142. In some embodiments, the number of shards 144 may be equal to, or approximately equal to the number of initial shards 124. In other embodiments, the number of shards 144 may be more or less than the number of initial shards 124. In any event, the redistribution process may decrease the average or aggregate entropy value in the shards 144 as opposed to the initial shards 124, so as to achieve better data locality within the data with respect to the re-sharding keys 142.

In some embodiments, the individual re-sharding nodes 130 may confer with one other to make a global decision to select a best set of statistics, re-sharding keys, and re-sharding scheme for all shards. In some embodiments, the global selection may be performed based on the confidence metric 138 determined by each re-sharding node. In some embodiments, the selection may be performed based on the sample size, or number of data items in each respective stream shard. In some embodiments, an averaging of the metrics of statistics from the re-sharding nodes may be performed.

In some embodiments, the redistribution operation may be performed in steps, so that at each step, a new re-sharding scheme is created using the collected gathered for that step period, and a new set of stream shards 144 are generated using that re-sharding scheme. In some embodiments, each step may occur on a regular periodic basis. In some embodiments, each step may occur on an as-needed basis, for example, when the number of data items in the initial shards 124 reaches a certain level. In some embodiments, the redistribution operation may be initiated by the data stream service 120. In some embodiments, the redistribution operation may be initiated (e.g., via an external call) by an external entity (e.g., a data consumer). In some embodiments, the redistribution operation may occur as part of an ongoing archival process to repeatedly store to persistent storage the contents of the input data. For example, in some embodiments, the input data may comprise records in an ongoing log, which is continually being ingested by the data stream service 120. The data stream service 120 just reorganizes the log data during the ingestion process, so that entropy of the data is reduced, with respect to certain keys, to permit downstream systems to access the log data more efficiently.

In some embodiments, the persistent storage may be part of a data store 150 that allocates data chunks 154 to each shard 144. The data store 150 may, via a chunk builder 152, build one chunk for each shard 144, so that the reduced entropy of the shards 144 is preserved in the data store. In some embodiments, the data store may generate one or more query optimization data structures 158 on top of the chunks of data received from the stream shards 144. Because each chunk contains largely homogenous data in terms of re-sharding key values, an efficient query optimization data structure (e.g., an index) may be created for the chunks based on the re-sharding keys 142. For example, a query engine 156 operating over the chunks may, in response to a query request filtering on a re-sharding key received from a client 160, determine which chunks contain data items satisfying the query, and which chunks do not, using the query optimization data structures 158. In this manner, not all chunks have to be scanned for the query, and query performance is improved.

Figure 2:
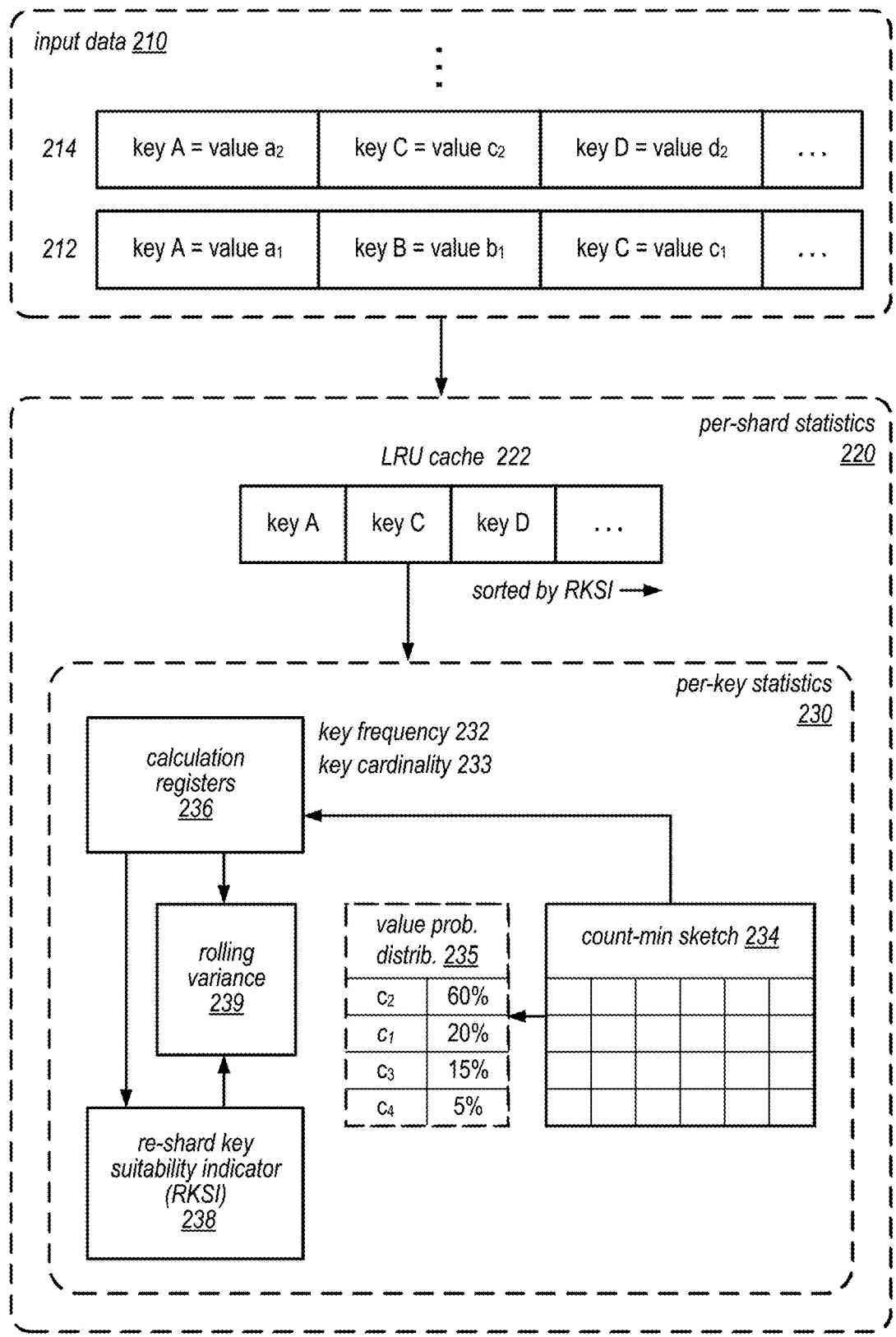
FIG. 2 illustrates example data structures used to maintain statistics captured by a stream re-sharding system to reduce data entropy across stream shards, according to some embodiments.

FIG. 2 illustrates example data structures used to maintain statistics captured by a stream re-sharding system to reduce data entropy across stream shards, according to some embodiments. As depicted, a data stream service 120 may receive an input data 210. The input data 210 may comprise of a sequence of records or data items, for example data items 212 and 214. The data items may each include key-value pairs, as shown. Some data items may include different keys from other data items. Some data items may contain more or less keys than other data items. Of course, the data values for the keys may also vary from data item to data item.

As discussed, the data items may be sharded randomly into shards, and provided to different re-sharding nodes. The re-sharding nodes may extract per-shard statistics 220 from its stream shard. In some embodiments, the distribution of data items by the record ingestor may be sufficiently random such that, given an sufficient amount of data, the extracted statistics 220 of each stream shard will converge to the same values.

Within the per-shard statistics extracted by each re-sharding node, the re-sharding node may maintain statistics for each distinct key seen in its stream shard. Such keys may be maintained in a data structure such as a hash table, so that previously encountered keys may be found by examining the table. In some embodiments, a least-recently-used (LRU) cache 222 may be used to store a subset of keys in the stream shard, so that only frequently seen keys are maintained in the re-sharding node's runtime memory. In the LRU cache, when the cache is filled to a point where eviction of cache entries (e.g. keys) becomes necessary, the cache is configured to evict the least recently used entry. Thus, some keys that have been seen but occur infrequently may not be kept in the LRU cache, but be stored in slower persistent memory (e.g., on disk). In this manner, the runtime memory used to maintain the list of keys is bounded by the size of the cache.

In some embodiments, the keys stored in the LRU cache 22 are also sorted according to the re-sharding key suitability indicator (RKSI). As discussed, the RKSI may be computed to determine how suitable a given key is to be used as a re-sharding key to redistribute the data. The ordering may be maintained using a linked list, that links each key in the list to a next key that has the next highest ranking in terms of RKSI. As the RKSI values of keys are updated, the linked list may be updated to reflect any changes in the rankings.

As shown, each key seen in the stream shard may also be associated with a set of per-key statistics 230. The per-key statistics may be kept in memory or on disk, depending on the cache status of that particular key. In some embodiments, the per-key statistics 230 may be bounded in size, so that the memory usage of the statistics collection module may be predicted and controlled ahead of time.

As shown, the per-key statistics 230 may include a count-min sketch 234. The count-min sketch is a probabilistic data structure that counts a large number of values, but compresses those counts into a smaller space, less than the large number. The compression is performed by hashing an identifier for each value to generate a location index in the count-min sketch. A counter at that location is then incremented. As may be appreciated, in some cases, collisions may occur between different values, so that two values may be counted using at the same location. To mitigate this problem, the count-min sketch may use a number of pair-wise independent hash functions to map the value identifier to a number of different locations. The counter at each location is incremented for each occurrence of the value. Thus, any collision between two values that may occur using one hash function is unlikely to be repeated using another hash function. At a later time when the count is to be retrieved, the count-min sketch takes all of the counts at each hashed location of the value, and then returns the minimum of those counts. Thus, even if some collisions did occur, as long as no collisions occurred at just one location (the minimum count), the count-min sketch will return the correct count. As may be understood, the count-min sketch may still return errors in rare cases. However, by adjusting the size of the count-min sketch based on the number of value counts, such errors are extremely unlikely. The count-min sketch thus limits the amount of memory that is needed to maintain a large number of counts, at the expense of a slight chance of error.

In the per-key statistics 230, every distinct value of every key may be counted in the count-min sketch 234. In some embodiments, the update of the count-min sketch 234 may occur very quickly, as only a set of hash values are computed to update a set of counters. Thus, the process does not slow down the ingestion of the input data stream. Assuming no collisions, the total of all value counts in the count-min sketch indicates the key's frequency 232. Moreover, the number of distinct values stored in the count-min sketch (e.g., the maximum of the number of used locations across each set of locations) indicates the key cardinality 233 of the key. In some embodiments, the frequency and cardinality of a key may be tracked separately from the count-min sketch.

As shown, a value probability distribution 235 may be determined from the count-min sketch 234. In some embodiments, in practice, the value probability distribution 235 may not be updated in memory as the data items in the stream shard are being ingested. The probabilities of values are readily determinable from querying the count-min sketch 234. However, the value probability distribution 235 is shown here for explanatory purposes. As shown, for the key C, four values $c_1$, $c_2$, $c_3$, and $c_4$ have been seen in the stream shard, and each is assigned a respective probability based on the counts of the values.

As shown, the per-key statistics 230 may include a number of calculation registers 236, which may be used to determine the re-sharding key suitability indicator (RKSI) 238. In some embodiments, the calculation registers 236 may track, for example, the key frequency 232 and key cardinality 233 of the key in question. In some embodiments, the calculation registers may also include intermediate values used to calculate the RKSI 238. The RKSI 238 may be determined from a RKSI function, which may produce RKSI values that vary directly the frequency of the key 232, and inversely with the value cardinality of the key 233. In some embodiments, the RKSI may be tracked in the memory of the re-sharding nodes, as the stream shard is being examined. Thus, as the RKSI 238 changes, the ordering of the key in the LRU cache 222 may also change accordingly.

As shown, in some embodiments, a rolling variance 239 may be maintained in the per-key statistics 230. The rolling variance 239 may be one way of measuring the stability of the statistics data, to determine whether it may be sufficiently trustworthy to be used to determine the key's RKSI 238. In some embodiments, the rolling variance 239 may be computed from the RKSI 238, based on the difference between one key's RKSI value and the RKSI values of the key's closet ranking neighbors. In some embodiments, the rolling variance 239 may be computed by taking examining the gathered statistics or intermediate values stored in the calculation registers 236. If the rolling variance is too high, this may indicate that different re-sharding nodes may reach different conclusions based on their respective stream shards. In that event, the re-sharding node may refrain from providing a RKSI value for the key at all, or adjust the RKSI value to reflect the lack of confidence in the value, or simply provide the rolling variance as another parameter into the re-sharding key selection function, depending on the embodiment.

FIGS. 3A and 3B illustrate an example count-min sketch structure that is used by a stream re-sharding system to reduce data entropy across stream shards, according to some embodiments. In some embodiment, the count-min sketch 320 may be used to keep track of counts for distinct values of a particular key, so that it may later be queried to produce a probability distribution of different values for that key.

In FIG. 3A, the count of a value v is updated using the count-min sketch 320. The updated may be performed, for example, by a value counting module 310, which may be implemented by a re-sharding node. During the update, a number of hash values of v may be computed, using a number of hash functions, such as hash functions $h_1$, $h_2$, $h_3$, and $h_4$. The hash functions may be selected so that they are pair-wise independent. Each of the hash function may hash the value v to a hash code from 1 to w, where w is the width 322 of the count-min sketch 320. The hash code may thus indicate a location in a row in the count-min sketch for that value v, so that a counter for v is maintained at that location in each row. The count-min sketch may perform this hashing and updating multiple times in parallel. For example, as shown, the count-min sketch 320 has a depth 324 of four, so that four hash functions are used to update four separate counters for the value v.

As may be understood, the count-min sketch compresses the value v by reducing it to a hash code in the space having w locations. When multiple values are counted using the same count-min sketch, multiple sets of counter and locations are used based on the hash values of the values. When a collision occurs, that is, when two values are hashed to the same location, the counter at that location is no longer usable. However, the values' counters at other locations are likely still usable, since the hash function are pairwise independent and thus another collision with the same value is extremely unlikely. Thus, at query time, a minimum may be taken of all of the counters for the value v, and that minimum will likely be the true count of the value v. As the number of values tracked by the count-min sketch increases, the width 322 and depth 324 may be increased accordingly, so as to reduce the probability of error.

FIG. 3B depicts a query of the value of v. As shown, in the value probability querying module or node 330, the counters at the four locations for value v are now retrieves using the same four hash functions. In some embodiments, the value probability querying module 330 may be implemented as part of the re-sharding node, or some other entity that is ultimately, for example, making the re-sharding scheme. As shown, of the four counters for v, the second and the third appears to have had some collision with other values, so that their count values are inflated. On the other hand, the first and fourth count values appear to be accurate, as they both reflect 930. Thus, when a minimum is taken of the four values, the result (930) reflects the correct count of value v. To determine the value probability of the value v, the querying module may divide the minimum count by the statistics sample size. For example, the count 930 may represent a count collected over 1000 data items having a particular key k. Accordingly, the value v has a probability of 93% for the key k.

In some embodiments, the count-min sketch may be used to count not just the occurrences of a value v overall in the statistics sample size (e.g., all data items that had the key k), but also occurrences of v given different combination of other key values. Such counts may be tracked by hashing not just the value v, but tuples of multiple re-sharding key values. Thus, when there is a second key U with distinct values $u_1$, $u_2$, and $u_3$, the probability of v given $u_1$ may be determined from a count of the tuple (v, $u_1$) stored in the count-min sketch. In some embodiments, the re-sharding node may first determine the ordered list of re-sharding keys, and then determine the counts of these tuples based on the ordering of the re-sharding keys. In this manner, a tree of probability distributions for the re-sharding key values may be generated based on the re-sharding key ranking.

FIG. 4 illustrates statistics data that is used to select a set of re-sharding keys used in a stream re-sharding system to reduce data entropy across stream shards, according to some embodiments. As shown, table 400 illustrates a number of keys 410, which may be keys seen in a stream shard by a re-sharding node. The cardinality column 420 and key frequency column 430 may represent statistics that are collected by the re-sharding node, for example, by counting the keys and values in the stream shard.

As shown, the keys 410 are ranked according to the RKSI column 440. The RKSI may be determined using a function, that combines the value cardinality 420 of a key and the frequency 430 of the key. In some embodiments, the function may product RKSI values that increase with increase values of frequency, and decrease with increasing values of cardinality. Thus, in such embodiments, the selected re-sharding keys 450 tend to be high-frequency keys that have relatively few distinct values. For example, as shown, the top-ranking key "operation" has a high frequency of 99%, and contains only two observed values "get" and "put." One reason behind choosing such keys is that such high-frequency, low-cardinality keys are likely to be used in subsequent queries, and so organizing the data using such keys are likely to be beneficial for downstream systems. Another reason to choose such key is that they tend to generate a re-sharding scheme that can include a longer list of re-sharding keys. Thus, for example, if a high-cardinality key such as "userID" is used as the first re-sharding key, this would subdivide the data very thinly, so that any further reorganization using other keys may no longer be useful. However, by using a low cardinality key such as "operation" as the leading re-sharding key, additional re-sharding keys may be used to further reorganize the data along other dimensions.

In the illustrated example, as shown, the RKSI is determined using a RKSI function that is directly proportional to the frequency 430 and inversely proportional to the logarithm of the cardinality 420. In some embodiments, using the logarithm for the cardinality reduces the effect of the number of distinct values on the RKSI, so that a key having 10,000 different values and another having 100,000 are not treated very differently by the system in terms of their cardinality. In some embodiments, the RKSI function may be configured to prefer a certain range of value cardinalities. This is because keys with very low cardinalities such as only 1 or 2 values may sometimes be not the most useful key for querying and analytical purposes. Thus, in some applications, the RKSI function may treat a higher value (e.g., 4 to 10), as the optimal cardinality for choosing re-sharding keys. In this example, as shown, the first three keys, "operation," "statusCode," and "error" are chosen as the re-sharding keys 450. These re-sharding keys may then be used to reorganize or redistribute the input stream data in subsequent steps.

Figure 5:
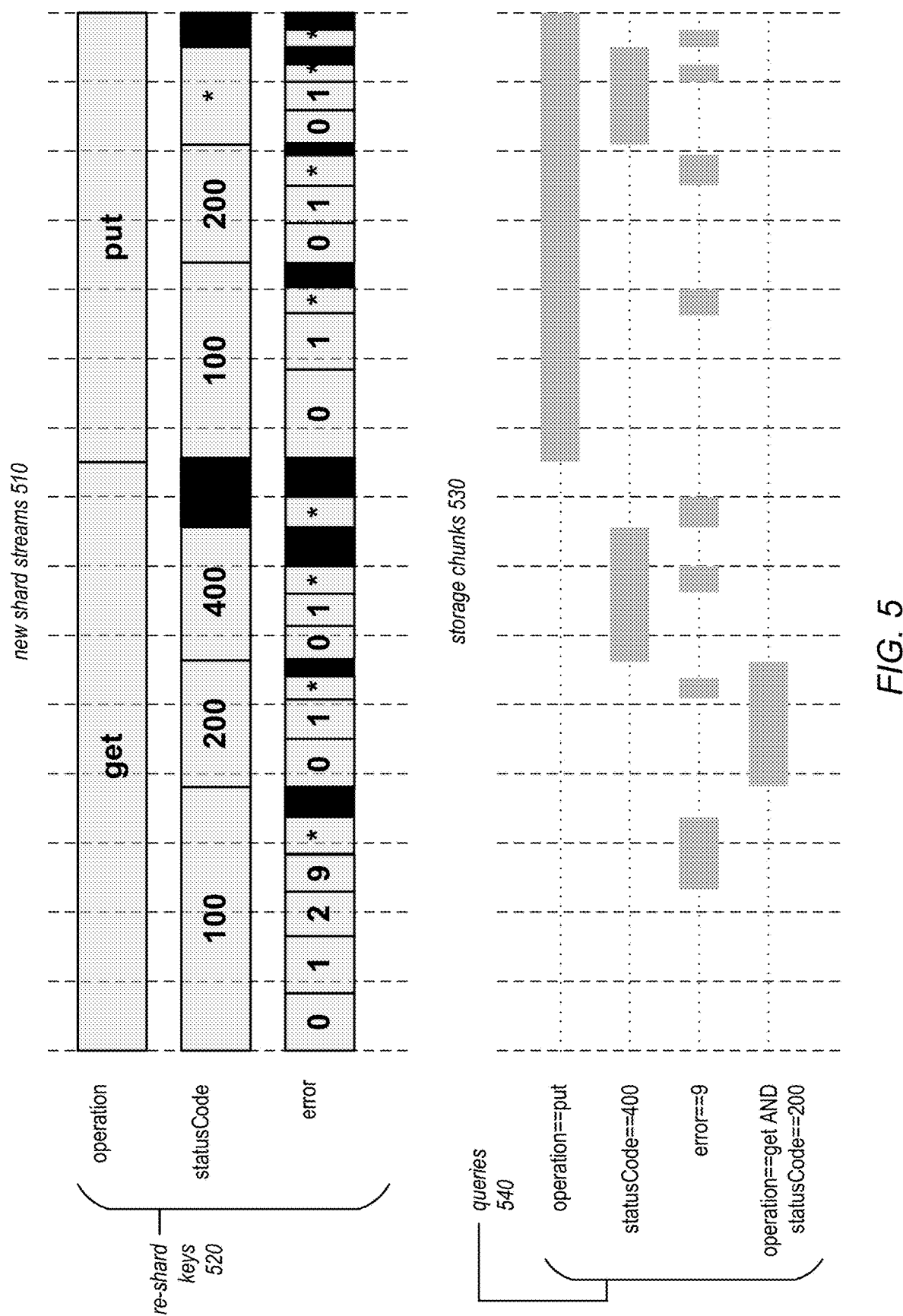
FIG. 5 illustrates a re-sharding scheme of stream data to new stream shards, and example queries on the redistributed data in storage, according to some embodiments.

FIG. 5 illustrates a re-sharding scheme of stream data to new stream shards, and example queries on the redistributed data in storage, according to some embodiments. As shown FIG. 5 is divided into a top portion and a bottom portion.

In the top portion, the figure illustrates a re-sharding scheme that is generated from an ordered list of re-sharding keys, for example, the re-sharding keys 450 shown in FIG. 4. In the figure, each section separated by a dotted line represents a new stream shard. In some embodiments, the re-sharding scheme may specify rules that dictate which shard in the set of new stream shards 510 a given data item will be redistributed to. The top portion of the figure illustrates the determination of the re-sharding scheme visually.

As shown, the process starts by examining the "operation" key of a hypothetical data item. The data item is assigned to one of two ranges of the new shards "get" and "put," based on its value of the "operation" key. In the next step, the next re-sharding key "statusCode" is used to determine a further subrange of the new shards for the data item. Thus, depending on whether the data item has 100, 200, or 400 for the "statusCode" key, or does not have the "statusCode" key (indicated in a range of black), it is assigned to a further subrange of the new stream shards 510. In addition, in some cases, another range (shown as "*") may be allotted for data items that may have any value for that re-sharding key. Such a range may be employed where a re-shading key has a number of values that occur infrequently, so that it yields little benefit to separate these values.

In some embodiments, whenever a subrange ends entirely within a single stream shard, the process stops. In cases where the data item ultimately ends up in a range spanning more than one stream shard, the redistribution process may simply send the data item to any of the remaining stream shards. Accordingly, the process continues down the hierarchy through all of the re-sharding key values, as necessary, until the new shards are fully subdivided among all value combinations of the re-sharing keys.

The process of generating the re-sharding scheme may occur by iterating over the re-sharding keys 520 in rank order. Given a range of new stream shards 510, the process proceeds by taking a first re-sharding key, and dividing the range into two subranges, one for data items that have the first re-sharding key, and another for data items that do not have the first re-sharding key. Then, within the subrange that is assigned to data items that has the first re-sharding key, further subdivisions are made to create subranges for each distinct value seen for the first re-sharding key. In some embodiments, each new stream shard has the same amount of capacity. Thus, to approximately balance the distribution of each new stream shard, the ranges are sized according to the value probability distributions determined from the value count-min sketch structures, which were populated during the statistics collection. In some embodiments, the value count-min sketch structures collected by each re-sharding node may be aggregated to create a more accurate probability distribution. Having divided the new shards streams into values ranges for the first re-sharding key, the process then repeats for each successive re-sharding key in the re-sharding key list. For each successive re-sharding key, every value range determined for the previous re-sharding key is further subdivided, based on the different values of the current re-sharding key, and based on the value probability distributions for the current re-sharding key. In some embodiments, the subdivision of a range may stop as soon as the range is reduced to a single stream shard. Alternatively, the process may continue until no more re-sharding keys remain in the list.

In the bottom portion of the figure, the figure illustrates a number of queries 540 that are issued against a data store having a number of storage chunks 530. In this example, the storage chunks 540 correspond exactly to the new stream shards 530 shown on the top portion of the figure. Thus, in this example, the new stream shards 510 may have been fed into the data store, such that the contents of each new shard are used to populate a single storage chunk of the data store. In this manner, the reduced entropy of each of the new stream shards is preserved in each of the storage chunks.

In some embodiments, the data store may take advantage of organization of the data to optimize the data for queries. For example, the data store may generate an index or query optimization data structure on top of the chunks 530, where the index indicates whether different combinations of re-sharding key values are present (or potentially present) within a given chunk. Thus, a query that specifies a filtering condition based on a re-sharding key may use the query optimization structure to determine that only certain chunks need to be scanned for data matching the query. The other chunks may be skipped.

In some embodiments, a probabilistic index may be created for data items using a two-tiered bloom filter. For example, a first-tier bloom filter may be injected with the keys of all data items in a chunk, and a second-tier bloom filter may be injected with all values of a particular key (or all keys) that exist in the chunk. Because bloom filters are probabilistic data structure that can return false positives, having a large number of different keys and values in a chunk increases the error rate of these indexes. However, when the entropy of the chunks is reduced, such that each chunk only holds a small set of keys or values, the indexes become less error-prone. In addition, when data is cleanly organized across the chunks, the query performs much better in practice, because a large number of chunks may be skipped.

Thus, as shown in the bottom portion of the figure, four example queries are listed. In the first query for "operation=put," only about half of the storage chunks 530 need to be scanned. In the second query for "statusCode=400," only two ranges of five chunks are scanned. For the third query "error=9," a fair number of chunks are scanned. However, a fair number of chunks are also skipped, due to the organization of the data. Finally, for the fourth query, which specifies two re-sharding keys as filtering conditions, only three chunks are scanned. It may be seen that when the re-sharding scheme is implemented to its fullest, any combination of re-sharding key query conditions can be mapped to some number of particular chunks. Thus, in some embodiments, the query index may be built directly from the re-sharding scheme generated by the re-sharing nodes.

Figure 6:
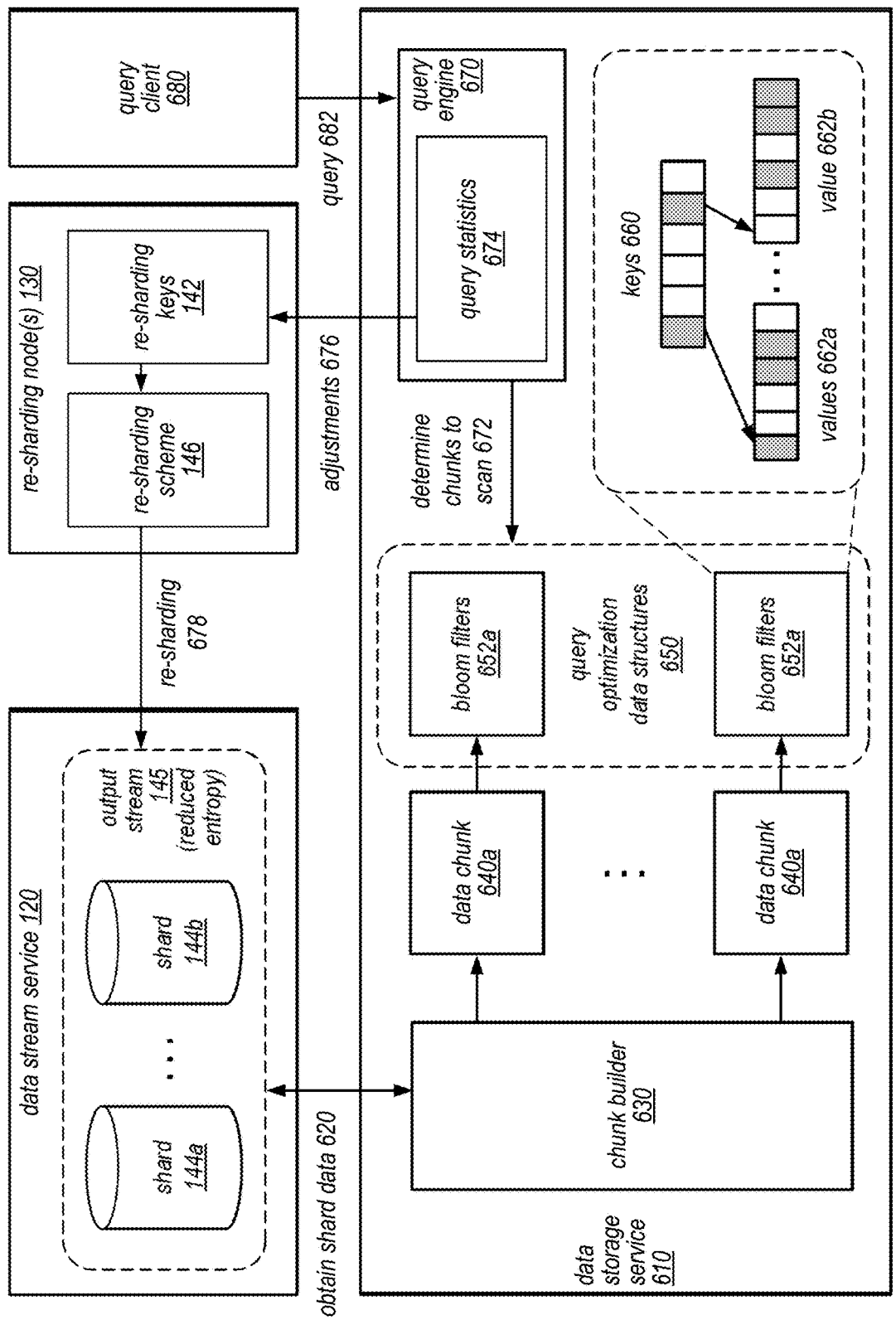
FIG. 6 is block diagram illustrating an example data storage service that stores stream shards with reduced data entropy, according to some embodiments.

FIG. 6 is block diagram illustrating an example data storage service that stores stream shards with reduced data entropy, according to some embodiments. As shown, the figure depicts a data storage service 610, which includes a chunk builder 630, and a query engine 670.

In some embodiments, the chunk builder 630 may communicate with the data stream service 120, so as to obtain data of the output stream 145 shard by shard. In some embodiments, this may be achieved via an API provided by the data stream service 120. In some embodiments, the chunk builder 630 may issue one or more queries to extract the shards from the data stream service 120.

In some embodiments, the chunk builder 630 may then store data from different shards 144 in different data chunks 640. For example, the chunk builder 630 may enforce a one-to-one mapping between shards and chunks. In some embodiments, once data from a shard is stored in in a chunk one or more query optimization data structures 650 may be generated for the chunks. In some embodiments, the query optimization data structures 650 may be generated as data items are placed into the chunk. In some embodiments, the query optimization data structures may include a set of bloom filters 652 for each data chunk 640. The bloom filters may be updated to reflect the different keys and values that are stored in its associated chunk, so that a later query may determine whether or not to scan the chunk, based on its bloom filters. In some embodiments, the query optimization data structures 652 may be generated in a separate step, and with user input. For example, the data storage service 610 may provide a configuration interface that allows a user to create the query optimization data structures 650, select the keys to be used to generate the query optimization data structures 650, or simply confirm a set of programmatically determined keys used to generate the query optimization data structures 650. In some embodiments, the configuration interface may have access to the set of re-sharding keys that were used to create the shards 144, and present the set of re-sharding keys to the user to be selected for use to generate the query optimization data structures 650.

As may be appreciated, because the bloom filters are probabilistic data structures, there is some possibility of false positives from the use of these structures, which reduces the efficiency of these structures in rare circumstances. However, the false positives are reduced when each chunk is organized to reduce its entropy. That is, when a chunk does not hold a large number of distinct keys and values, collisions (and thus false positives) are less likely in the bloom filters.

As shown, in some embodiments, the bloom filters 652 may be implemented as a two-tiered structures of bloom filters, including a top-level bloom filter 660 that stores keys in the chunk, and one or more second level bloom filers 662 that stores the values of the keys. In some embodiments, the top-level key bloom filter may contain references to the second level value bloom filters. Thus, query engine 670 may use the bloom filters to determine 672 to determine which chunks need to be scanned when servicing a query 682. The query engine 670 may first check if a key exists in a chunk using the top-level bloom filter, and if so, obtain the value bloom filter associated with that key to determine if the queried for value exists in the chunk.

As shown, in some embodiments, the query engine 670 may capture query statistics 674 as queries are performed on the data chunks 640. The query statistics 674 may indicate frequencies of different filtering conditions that are specified in queries received by the query engine 670. For example, the query statistics may indicate that 90% of the queries included an "operation" filter, and that 50% of the queries included a "statusCode" filter. In some embodiments, the query statistics 674 may include frequencies of different values that are included in query filters. These query statistics 674 may then be used to make adjustments 676 to the re-sharding scheme generated by the re-sharding nodes 130, for a future set of shards of a future stream received by the data stream service 120. For example, as shown, the adjustments 676 may be used to select the re-sharding keys 142 for a future redistribution of data items. A key that was observed to be frequently used in queries may be ranked higher as a re-sharding key 142. In some embodiments, the query statistics 674 may be used in conjunction with the other statistics seen in the shards 144, such as key cardinality or frequency. In this manner, the re-sharding strategy of the data stream service 120 may automatically adapt to the querying behavior seen by the query engine 670, so that the data is organized in the most efficient way for future queries.

Figure 7:
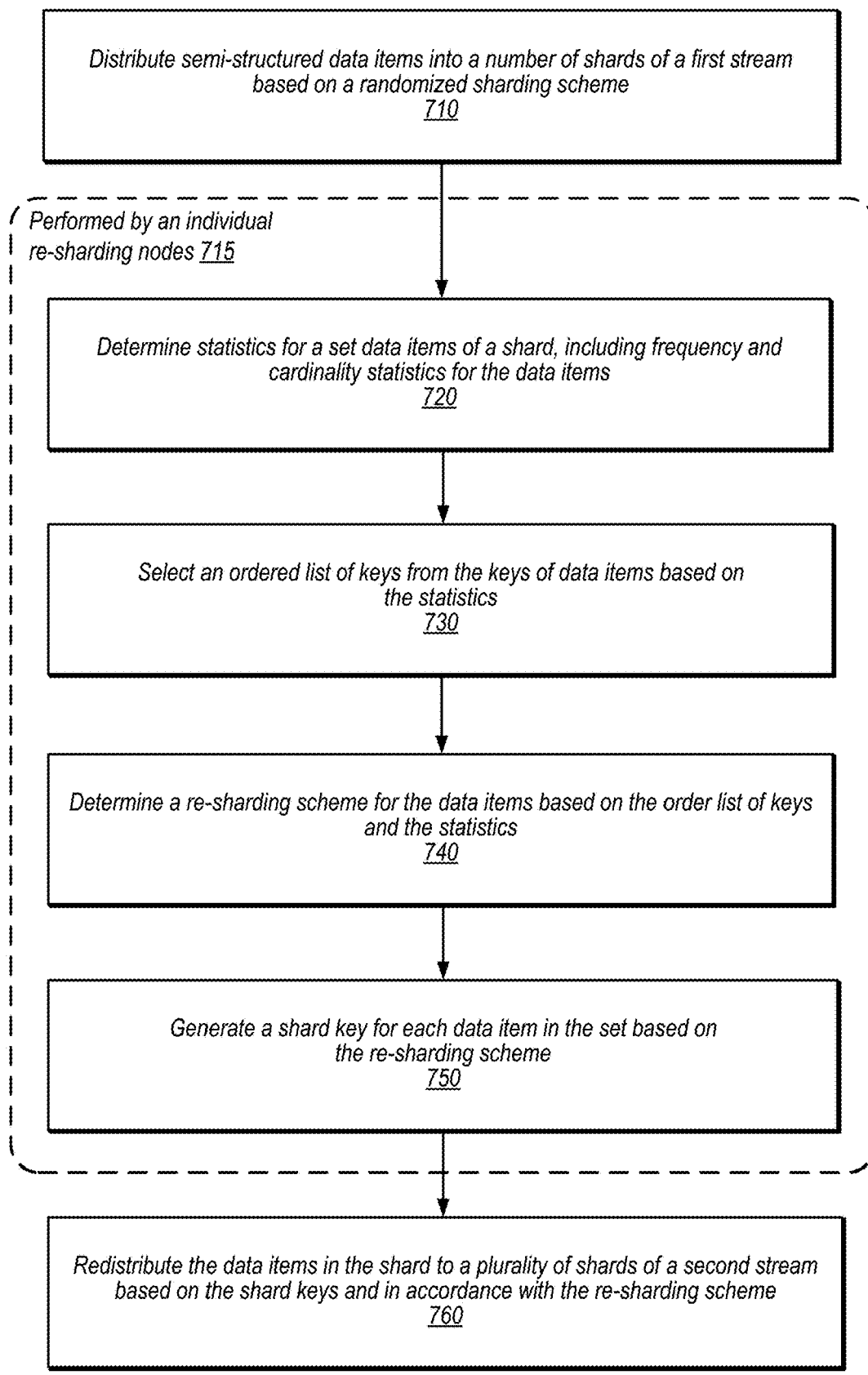
FIG. 7 is a flowchart illustrating an example process of redistributing a set of stream shards into a new set of stream shards to reduce data entropy, according to some embodiments.

FIG. 7 is a flowchart illustrating an example process of redistributing a set of stream shards into a new set of stream shards to reduce data entropy, according to some embodiments. The operations of FIG. 7 may be performed, for example, by various elements of the data stream service 120 and re-sharding nodes, as discussed in connection with FIG. 1.

At operation 710, semi-structured data items are distributed into a number of stream shards of a first stream, in a random fashion. This operation may be performed by for example the record ingestion module or node 122, as discussed in connection with FIG. 1. In some embodiments, the a data stream service may use a record ingester 122 to randomly distribute input data items to a plurality of stream shards using a randomization function. The stream shards may each represent a unit of bandwidth for the data stream service 120. In some embodiments, the distribution of the input data stream is performed in a sufficiently random manner, so that the relevant statistics collected by the re-sharding nodes for redistribution purposes will be the same, given a sufficient amount of data in the input stream.

As indicated in operation 715, in some embodiments, operations 720, 730, 740, and 750 may be performed by an individual re-sharding node. Depending on the embodiment, and individual re-sharding node may include one or more compute nodes, software module, process or threads, or any combination thereof. It should be noted that in some embodiments, more or less operations in the figure may be performed by the individual re-sharding node. It should also be noted that the operations performed by an individual re-sharding node may be performed by just one re-sharding node, a set of re-sharding nodes for all shards, or a set of re-sharding nodes for a subset of the shards. Because the input data is distributed randomly, the statistical results seen by each of the re-sharding nodes are likely to converge over time. However, in some embodiments, multiple re-sharding nodes may be used to collect statistics from multiple stream shards, so that their respective results may be aggregated or compared to increase the confidence of the statistics. However, in some embodiments, each re-sharding node may act completely independently to redistribute its stream shard according to its own statistics.

At operation 720, statistics are determined from a stream shard by an individual re-sharding node. The statistics may include, for individual keys seen in the stream shard, a frequency of the key, and (b) a cardinality indicating a number of distinct values seen for the key. In some embodiments, such statistics are captured as counts, which may be tracked in a fixed-sized probabilistic data structure such as a count-min sketch. In some embodiments, every occurrence of every value of every key seen in the stream shard are counted in the count-min sketch. Thus, the total value of all tracked in the count-min sketch may represent the key frequency, and the number of different counts tracked in the count-min sketch may represent the value cardinality of the key. In some embodiments, the frequency and cardinality of a key may be tracked as two standalone values in the count-min sketch. In some embodiments, these statistics may be tracked by other means, outside of the count-min sketch.

At operation 730, an ordered list of re-sharding keys are selected from the keys seen in the stream shard. The selection may be performed based on the keys' frequencies, cardinalities, or other statistics, as determined during the statistics collection. In some embodiments, the selection may be made based on a computed re-sharding key suitability indicator, which is determined from a function of the collected statistics. In some embodiments, the RKSI may prefer keys that have a high frequency and a low value cardinality. In some embodiments, a rolling variance may be used as a factor in computing the RKSI. For example, keys whose statistics are associated with high confidence may be ranked more highly. In some embodiments, the rolling variance may be compared against a specified confidence threshold, such that if it fails to exceed the threshold the key in question will not be selected as a re-sharding key. In some embodiments, the manner in which keys are selected or ranked as re-shard keys may be configurable by a user or administrator, via a user interface or programmatic interface. For example, an administrator may be permitted to provide a set of weights that are used to assign relative importance to different types of statistics that are used to select or rank re-shard keys. In some embodiments, the different types of statistics may themselves be ranked, so that the ranked list of statistics are used as successive tie breakers during the selection or ranking process. In some embodiments, the selected re-sharding keys are stored as an ordered list ranked according to the RKSI. In some embodiments, the system may provide an interface that allows a user or administrator to make updates to the ordered list after it has been generated. For example, a configuration interface may allow the administrator to add or remove keys from the re-shard key list, or adjust the ordering of keys in the re-shard key list. In some embodiments, all keys seen in the stream shard are ranked and selected as potential re-sharding keys. In some embodiments, the selection of re-sharding keys may be a global decision that is made using the statistics collected by all re-sharding nodes. Thus, the statistics from each re-sharding node may be aggregated to make the selection. In some embodiments, each re-sharding node may cast a vote to recommend or not recommend a particular key as a re-sharding key.

At operation 740, a re-sharding scheme is generated to redistribute the data items into a number of new stream shards based on the ordered list of re-sharding keys and the statistics. In some embodiments, the re-sharding scheme may include a number of rules that dictates the particular new stream shard, or range of new stream shards that a given data item should be redistributed to, given the data item's re-sharding key values. The re-sharding scheme may be generated using an iterative process that repeatedly subdivides the new stream shards into smaller and smaller ranges, each range corresponding to a particular combination of re-sharding key values. In some embodiments, the subdivisions may be made so that the range for each re-sharding key value is sized based on the relative probability distribution of all the different values for that re-sharding key. In some embodiments, the subdividing may stop as soon as a range is reduced to just a single stream shard.

At operation 750, a shard key is generated for each data item in the shard based on the re-sharding scheme. This operation may be performed by, for example, the shared key generator 140, as discussed in connection with FIG. 1. In some embodiment, the data items may be sent back to the data stream service 120 along with their shard keys, so that the data stream service can redistribute the data items into new shards 144 using the shard keys. In some embodiments, the shard key generator may be aware of the hashing function used by the data stream service to partition data items into shards. Thus, the shard key generator may generate shard keys in a manner so that each data item ends up in the desired shard. In some embodiments, the shard key generator may simply generate shard key so that data items having the same combination of re-sharing key value have the same shard key. This would thus ensure that all data items having the same combination of key values will end up in the same set of new shards.

At operation 760, the data items are redistributed to the new stream shards of a second stream, based on the shard keys and according to the re-sharding scheme. In some embodiments, this distribution may be performed by data stream service 120. In some embodiments, the stream processor may periodically perform a redistribution operation to flush recently received stream data into persistent storage. Each redistribution operation may cause a new re-sharding scheme to be created, based on statistics collected for the recently received stream shards. In some embodiments, the redistribution operation may be triggered by events in the stream processor, such as for example when stream shard storage buffers reach a certain capacity level. As discussed, due to the reorganization of the data, the new stream shards may exhibit a lower overall and average entropy value than the stream shards randomly partitioned from the initial input data.

Figure 8:
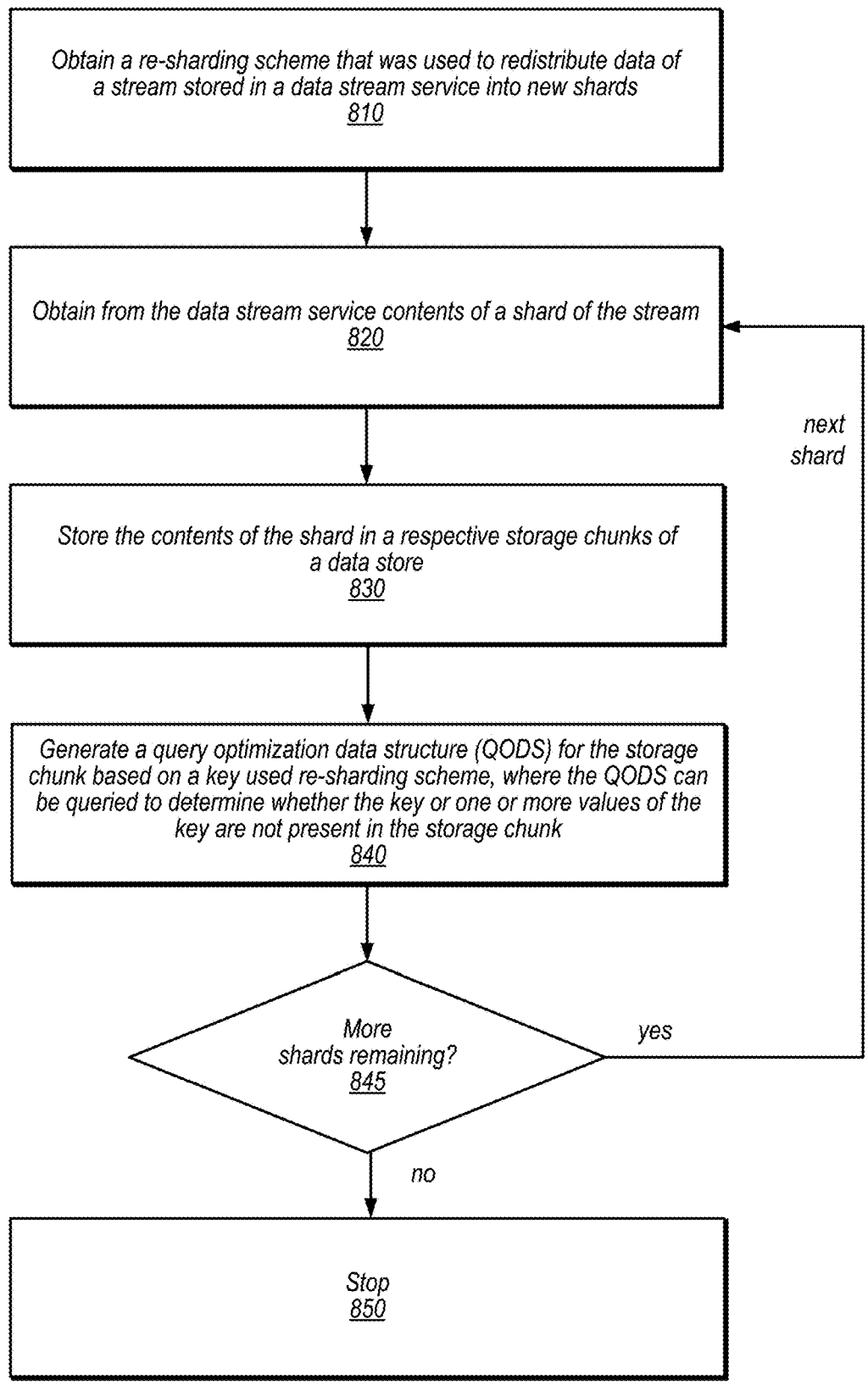
FIG. 8 is a flowchart illustrating an example process of building storage chunks used to store redistributed stream shards, according to some embodiments.

FIG. 8 is a flowchart illustrating an example process of building storage chunks used to store redistributed stream shards, according to some embodiments. The operations of FIG. 8 may be performed, for example, by a chunk builder 630, as discussed in connection with FIG. 6.

At operation 810, a re-sharding scheme is obtained that was used to redistribute data of a stream stored in a data stream service into new shards. In some embodiments, the re-sharding scheme may be obtained from the re-sharding nodes or the data stream service, so that a chunk builder can determine which keys should be used to generate query optimization data structures. In some embodiments, the re-sharding nodes may be part of the chunk builder.

At operation 820, the contents of a shard of the stream is obtained from the data stream service. As shown at operation 845, the process may be repeated for all shards of the stream. In some embodiments, the contents of a shard may be obtained via a API exposed by the data stream service. In some embodiments, data for a particular shard may be obtained via querying. In some embodiments, data for the shard may be obtained in batches, or in a stream.

At operation 830, the contents of the stream shard are stored in a respective storage chunk in the data store. In some embodiments, the chunk builder may be responsible for allocating the storage chunk for the shard contents. Because the contents of each stream shard are stored in separate chunks, the reduced entropy of the stream shards is preserved. An example of such chunking of data is shown for example in the bottom portion of FIG. 5.

At operation 840, a query optimization data structure (QODS) for a storage chunk is generated based on a key used in the re-sharding scheme. In some embodiments, the generated QODS be queried to determine whether the key or one or more values of the key is not present in the storage chunk. Thus, the QODS may allow for faster searching during the servicing of a query. The QODS may be built ahead of time based on the contents of each chunk, and may be updated over time, as additional data items are added to or removed from the chunks. In some embodiments, the QODS may be generated based in part on user input. For example, user input provide via a configuration interface may specify which keys and ordering of keys to be used to generate the QODS. In some embodiments, the configuration interface may present the list of re-shard keys that were used to redistribute the shards that created the storage chunks. The configuration interface may present the list of re-shard keys to an administrator to allow the administrator to select which re-shard keys to use to generate the QODS. In some embodiments, a probabilistic query index may be used to indicate whether particular key-value pairs exist in a chunk. In some embodiments, the probabilistic query index may be used to always correctly determine that a given key value pair is not in the chunk, but may return false positives in some cases as to whether a key value pair is in the chunk. In some embodiments, the probabilistic query index may be implemented using a two-tiered bloom filter structure, where the keys in the chunk are inserted into a first-tier bloom filter, and the values for each respective key are inserted into one or more second-tier bloom filters.

At operation 845, a determination is made whether additional shards remain for the stream. If so, the process loops back to operation 820, where the contents of a next shard are obtained from the data stream service to be stored in another chunk. If there are no more shards remaining for the stream, the chunks have been completely built for the stream, and the process stops at operation 850.

Figure 9:
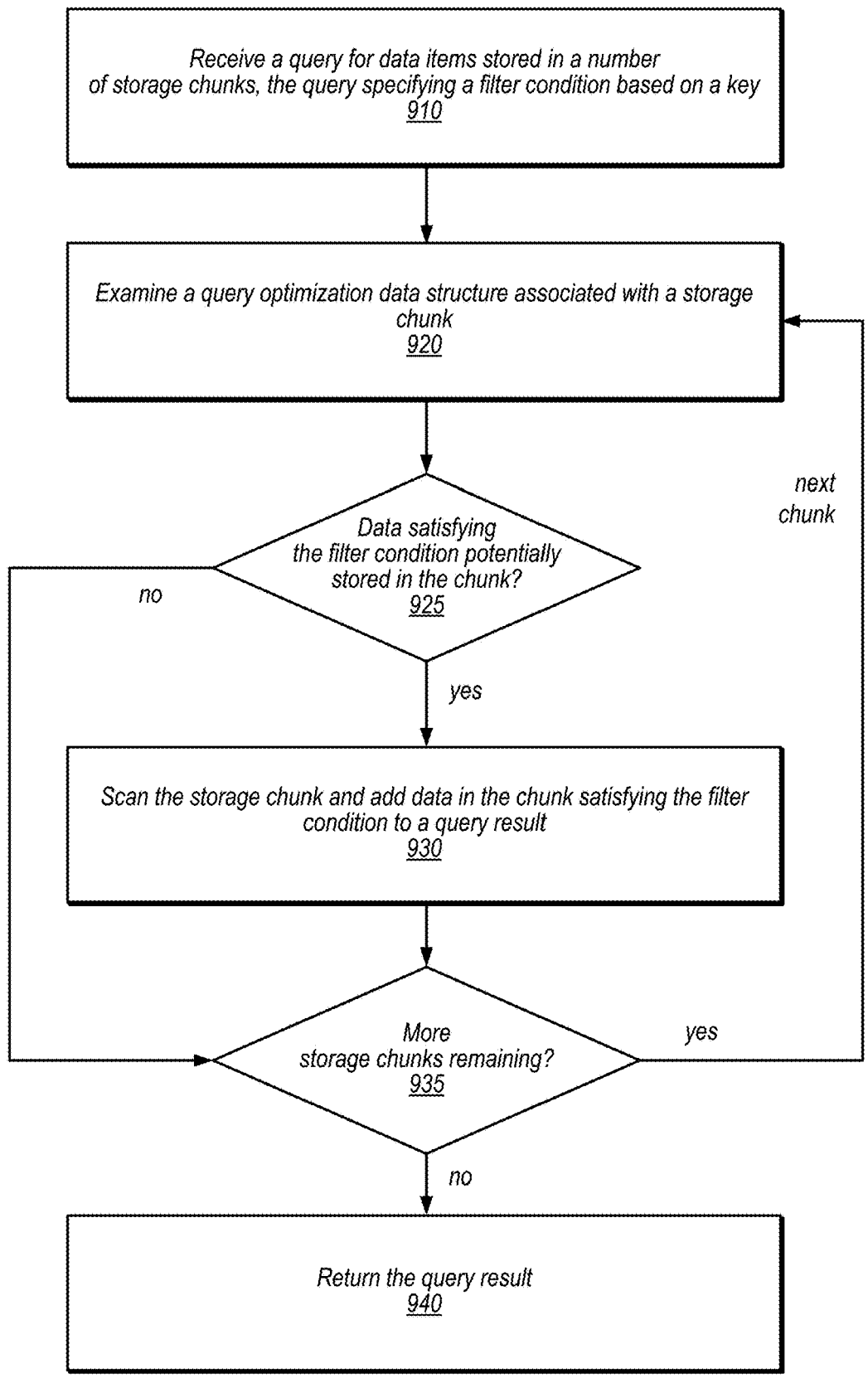
FIG. 9 is a flowchart illustrating an example process of handling a query in a data store storing redistributed stream shards, according to some embodiments.

FIG. 9 is a flowchart illustrating an example process of handling a query in a data store storing redistributed stream shards, according to some embodiments. The operations of FIG. 9 may be performed, for example, by a query engine 670, as discussed in connection with FIG. 6.

At operation 910, a query for data items stored in a number of chunks is received. The query may specify a filter condition based on a key. Thus, for example, the data store may receive a query that looks like one of the queries 540 shown in the bottom portion of FIG. 5. As discussed, data stored in the chunks may be reorganized according to a set of re-sharding keys. The key that is specified in the query may be a re-sharding key, which was selected based on the likelihood that it may be later used in queries. Thus, the redistribution process organizes the data in a way to optimize for the later queries.

At operation 920, a query optimization data structure (QODS) associated with a storage chunk is examined. As shown, the process will repeat for all storage chunks that are subject to the query. In some embodiments, each chunk is associated with a QODS, which indicates whether the certain keys and values are present in the chunk. The QODS may be built using the re-sharding keys selected during a reorganization of the data that produced the chunks being queried. In some embodiments, the QODS is based on one or more bloom filters, so that false positives may be produced.

At operation 925, a determination is made whether data satisfying the filter condition of the query is potentially stored in the chunk. As discussed, the determination may be made from examination of the QODS. If data satisfying the query does potentially exist in the chunk, the process proceeds to operation 930 to perform a scan of the chunk. On the other hand, if the QODS indicates that the chunk does not contain any data items that potentially satisfy the query, the process skips the scanning operation 930, and proceeds to operation 915. Accordingly, as can be seen, in some cases, the QODS allows the query engine to skip over certain chunks, thereby speeding up query processing.

At operation 930, the storage chunk is scanned, and any data found in the chunk that satisfies the filter condition is added to a query result. The query result may be maintained in a buffer that collects data items that meet the query's filter criteria until all storage chunks have been checked.

At operation 935, a determination is made whether more storage chunks remain to be checked. Thus, in some embodiments, the query engine may proceed down a list of storage chunks to check each for data items satisfying the query. In some embodiments, the process may be performed in parallel by a number of nodes, processes, or threads. If query engine determines that no more chunks remain to be check, the process then proceeds to operation 940, where the query result being aggregated is returned to the querying client. If the query engine determines that more chunks remain, the process proceeds back to operation 920 to examine the next chunk.

As will be appreciated by those skilled in the art, query performance improvement is just one application that can benefit from the entropy reduction process described herein. The entropy reduction may also realize benefits in other applications, depending on the context.

Figure 10:
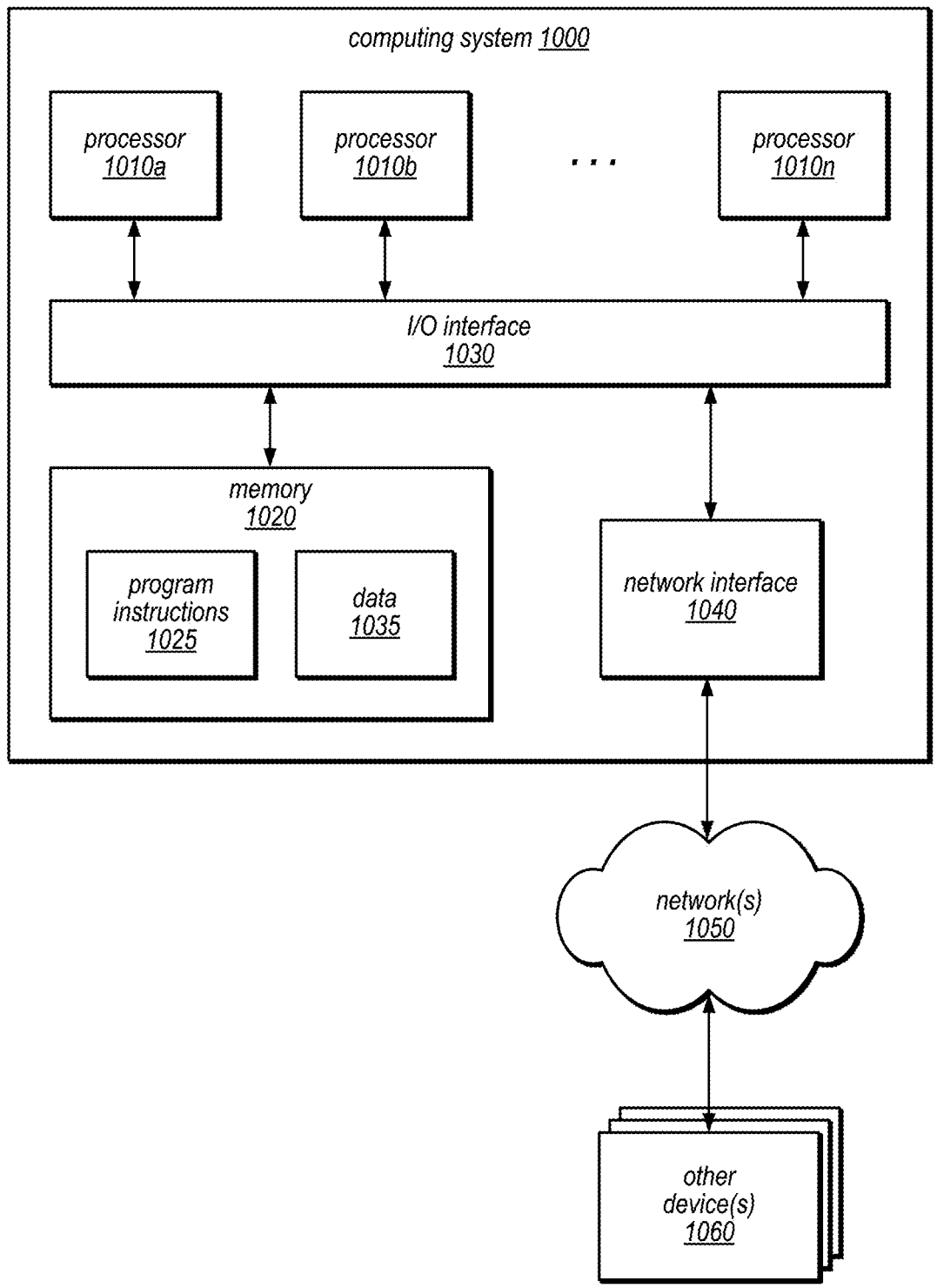
FIG. 10 is a block diagram illustrating an example computer system that can be used to implement one or more portions of a stream re-sharding system that reduces data entropy across stream shards, according to some embodiments.

FIG. 10 is a block diagram illustrating an example computer system that can be used to implement one or more portions of a stream re-sharding system that reduces data entropy across stream shards, according to some embodiments. Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
one or more hardware processors with associated memory that implement:
a data stream service configured to:
receive semi-structured data items to be added to a first stream, the data items having a plurality of different key-value pairs;
distribute the data items into a plurality of shards of the first stream based on a randomized sharding scheme; and
a plurality of re-sharding nodes, each configured to:
obtain data items of a respective different shard of the plurality of shards from the data stream service, and:
determine statistics for a set of the data items of the respective shard, including frequency and cardinality statistics for the set of data items;
select an ordered subset of the keys in set of data items based at least in part on the statistics;
determine a re-sharding scheme based at least in part on the ordered subset of keys and the statistics; and
wherein the data stream service is configured to:
redistribute the set of data items to a plurality of shards of a second stream based at least in part on the re-sharding scheme.

2. The system of claim 1, wherein the re-sharding node is configured to:
determine a re-shard key suitability indicator (RKSI) of each key in the set of data items, wherein the RKSI of a given key increases with increasing values of the given key's frequency, and decreases with increasing values of the given key's value cardinality; and
determine a confidence metric for each key in the set of data items based on a difference between the RKSI value of the key and the RKSI value of a next higher ranking or lower ranking key in the ordered subset, wherein to select the ordered subset of keys, the re-sharding node is configured to make the selection based at least in part on the RKSI and the confidence metric for each key.

3. The system of claim 1, wherein the one or more hardware processors with associated memory implements a storage chunk builder, configured to:
store contents of each shard of the second stream in a respective storage chunk of a data store; and
generate a query optimization data structure for the storage chunks based at least in part on the keys in the ordered subset, wherein the query optimization data structure indicates a subset of the storage chunks that do not contain data items having particular values for particular ones of the keys in the ordered sub set.

4. The system of claim 3, wherein the one or more hardware processors with associated memory implements query engine, configured to:
receive a query specifying a filter condition based on one or more of the keys in the ordered subset; and
generate a response to the query, wherein the generation of the response comprises determining storage chunks to scan based at least in part on the query optimization data structure.

5. A computer-implemented method, comprising:
distributing data items having a plurality of different key-value pairs into a plurality of shards of a stream;
determining statistics from a set of data items of a shard of the plurality of shards, including frequency and cardinality statistics for the set of data items;
selecting an ordered subset of the keys in the set of data items based at least in part on the statistics;
determining a re-sharding scheme based at least in part on the ordered subset of keys and the statistics; and
redistributing the set of data items in the shard to a plurality of other shards based at least in part on the re-sharding scheme.

6. The computer-implemented method of claim 5, further comprising:
determining a re-shard key suitability indicator (RKSI) of each key in the set of data items, wherein the RKSI of a given key increases with increasing values of the given key's frequency, and decreases with increasing values of the given key's value cardinality; and
wherein selecting the ordered subset of keys comprises making the selection based at least in part on the RKSI for each key.

7. The computer-implemented method of claim 6, further comprising:
  determining a confidence metric for each key in the set of data items based at least in part on a difference between the RKSI value of the key and the RKSI value of a next higher ranking or lower ranking key in the ordered subset; and
  wherein selecting the ordered subset of keys comprises making the selection based at least in part on the confidence metric.

8. The computer-implemented method of claim 5, further comprising:
  receiving an input via an interface specifying respective weights for one or more of the determined statistics, and wherein selecting the ordered subset of keys comprises ranking individual keys based at least in part on a weighed combination of the one or more determined statistics using the respective weights.

9. The computer-implemented method of claim 5, further comprising:
  prior to determining the re-sharding scheme, adjusting the ordered subset of keys based at least in part on input received via a configuration interface.

10. The computer-implemented method of claim 5, further comprising:
  generating respective shard key values for each data item in the set based at least in part on the re-sharding scheme; and
  wherein the redistributing of the set of data items to the plurality of other shards is performed based at least in part on a hash of the respective shard key values.

11. The computer-implemented method of claim 6, further comprising:
  storing contents of each of the other shards in a respective storage chunk of a data store; and
  generating a query optimization data structure for the storage chunks based at least in part on the keys in the ordered subset, wherein the query optimization data structure indicates a subset of the storage chunks that do not contain data items having particular values for particular ones of the keys in the ordered subset.

12. The computer-implemented method of claim 11, wherein
  generating the query optimization data structure is based at least in part on a user input indicating one or more keys in the ordered subset to use to generate the query optimization data structure.

13. The computer-implemented method of claim 11, wherein generating a query optimization data structure comprises:
  performing, for each data item stored in a storage chunk:
  inserting a key in the data item into a first-level bloom filter associated with the storage chunk; and
  inserting a value for the key into a second-level bloom filter associated with the storage chunk.

14. The computer-implemented method of claim 11, further comprising:
  receiving a query specifying a filter condition based on one or more of the keys in the ordered subset; and
  generating a response to the query, wherein the generation of the response comprises determining storage chunks to scan based at least in part on the query optimization data structure.

15. The computer-implemented method of claim 11, further comprising:
  capturing query statistics for queries of the storage chunks;
  selecting a second ordered subset of the keys in data items in a second plurality of shards of a second stream, wherein the selection of the second ordered subset of keys is based at least in part on the query statistics; and
  redistributing the data items in the second plurality of shards based at least in part on the second ordered subset of keys.

16. A non-transitory computer-accessible storage medium storing program instructions that when executed on one or more processors of a re-sharding node, cause the re-sharding node to:
  determine statistics from a set of data items in a shard of a plurality of shards of a stream, wherein the statistics include frequency and cardinality statistics for the set of data items;
  select an ordered subset of keys in the set of data items based at least in part on the statistics; and
  determine a re-sharding scheme based at least in part on the ordered subset of keys and the statistics, wherein the re-sharding scheme specifies how the set of data items are to be redistributed to a plurality of other shards.

17. The non-transitory computer-accessible storage medium of claim 16, wherein the program instructions when executed on the one or more processors cause the re-sharding node to:
  determine a re-shard key suitability indicator (RKSI) of each key in the set of data items, wherein the RKSI of a given key increases with increasing values of the given key's frequency, and decreases with increasing values of the given key's value cardinality; and
  wherein to select the ordered subset of keys, the program instructions when executed on the one or more processors cause the re-sharding node to make the selection based at least in part on the RKSI for each key.

18. The non-transitory computer-accessible storage medium of claim 17, wherein the program instructions when executed on the one or more processors cause the re-sharding node to:
  determine a confidence metric for each key in the set of data items based at least in part on a difference between the RKSI value of the key and the RKSI value of a next higher ranking or lower ranking key in the ordered subset, and
  wherein to select the ordered subset of keys, the program instructions when executed on the one or more processors cause the re-sharding node to make the selection based at least in part on the confidence metric.

19. The non-transitory computer-accessible storage medium of claim 16, wherein to determining the re-sharding scheme, the program instructions when executed on the one or more processors cause the re-sharding node to:
  for each key in the ordered subset, starting with a single range including all shards in the plurality of other shards, divide one or more ranges of the other shards into subranges corresponding to different values of the key, wherein the division is based at least in part on a value probability distribution of the key.

20. The non-transitory computer-accessible storage medium of claim 19, wherein to determine the statistics, the program instructions when executed on the one or more processors cause the re-sharding node to:
  update a count-min sketch for a key in the set of data items to track a count of each distinct value for the key in the set of data items, wherein the value probability distribution for the key is determined based at least in part on the count-min sketch.

* * * * *